(12) United States Patent
Ko et al.

(10) Patent No.: US 12,084,731 B2
(45) Date of Patent: Sep. 10, 2024

(54) DEVICE FOR MANUFACTURING MOLTEN IRON

(71) Applicant: POSCO, Pohang-si (KR)

(72) Inventors: Chang Kuk Ko, Pohang-si (KR); Myoung Kyun Shin, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 622 days.

(21) Appl. No.: 17/294,197

(22) PCT Filed: Nov. 1, 2019

(86) PCT No.: PCT/KR2019/014703
§ 371 (c)(1),
(2) Date: May 14, 2021

(87) PCT Pub. No.: WO2020/105901
PCT Pub. Date: May 28, 2020

(65) Prior Publication Data
US 2022/0002826 A1    Jan. 6, 2022

(30) Foreign Application Priority Data
Nov. 22, 2018 (KR) .......................... 10-2018-0145287

(51) Int. Cl.
*C21B 13/14* (2006.01)
*B01D 47/00* (2006.01)
(Continued)

(52) U.S. Cl.
CPC ............ *C21B 13/146* (2013.01); *B01D 47/00* (2013.01); *B01D 53/18* (2013.01);
(Continued)

(58) Field of Classification Search
CPC .............. C21B 13/146; C21B 13/0033; C21B 13/0073; C21B 13/14; C21B 2100/44;
(Continued)

(56) References Cited

U.S. PATENT DOCUMENTS

| | | | |
|---|---|---|---|
| 6,214,084 B1* | 4/2001 | Saxena | C21B 13/0006 75/502 |
| 8,753,422 B2* | 6/2014 | Gharda | C21B 13/0033 75/505 |
| 2015/0345870 A1* | 12/2015 | Jung | C21B 13/004 266/156 |

FOREIGN PATENT DOCUMENTS

| | | |
|---|---|---|
| AT | A11092000 | 9/2001 |
| CN | 101117650 | 2/2008 |

(Continued)

OTHER PUBLICATIONS

International Search Report—PCT/KR2019/014703 dated Feb. 10, 2020.

(Continued)

*Primary Examiner* — Keith D. Hendricks
*Assistant Examiner* — Moriah S. Smoot
(74) *Attorney, Agent, or Firm* — CANTOR COLBURN LLP

(57) ABSTRACT

A device for manufacturing molten iron is provided. The device for manufacturing the molten iron includes a multi-stage fluidized reduction furnace for reducing a powdered iron ore including hematite and limonite, a melting gas furnace connected to the fluidized reduction furnace through an ore conduit and a gas conduit, a fluidized bed oxidation furnace for oxidizing magnetite to be converted into hematite through steam provided from the fluidized reduction furnace, and a hydrogen processing unit for processing hydrogen generated by the oxidation reaction of magnetite in the fluidized bed oxidation furnace.

6 Claims, 2 Drawing Sheets

(51) Int. Cl.
    *B01D 53/18* (2006.01)
    *C21B 13/00* (2006.01)
    *F27B 15/02* (2006.01)
(52) U.S. Cl.
    CPC ...... *C21B 13/0033* (2013.01); *C21B 13/0073* (2013.01); *C21B 13/14* (2013.01); *F27B 15/02* (2013.01); *C21B 2100/44* (2017.05); *C21B 2100/66* (2017.05); *C21B 2300/02* (2013.01)
(58) Field of Classification Search
    CPC ............ C21B 2100/66; C21B 2300/02; C21B 2100/28; C21B 2100/64; C21B 13/0086; C21B 2100/60; B01D 47/00; B01D 53/18; F27B 15/02; Y02P 10/134
    See application file for complete search history.

(56) References Cited

FOREIGN PATENT DOCUMENTS

| | | |
|---|---|---|
| CN | 102575304 | 7/2012 |
| CN | 104870657 | 8/2015 |
| KR | 101050800 | 7/2011 |
| KR | 101321928 | 10/2013 |
| KR | 101321928 B1 * | 10/2013 |
| KR | 101376138 | 3/2014 |
| KR | 101384800 | 4/2014 |
| KR | 101384800 B1 * | 4/2014 |
| KR | 101384802 | 4/2014 |
| KR | 101451405 | 10/2014 |
| KR | 101451405 B1 * | 10/2014 |
| KR | 20150006937 | 1/2015 |
| KR | 20150006937 A * | 1/2015 |
| KR | 101541900 | 8/2015 |
| KR | 20190021552 | 3/2019 |
| KR | 20200015041 | 2/2020 |
| KR | 20200043176 | 4/2020 |
| KR | 20200059933 | 5/2020 |

OTHER PUBLICATIONS

PCT Written Opinion—PCT/KR2019/014703 issued on Feb. 10, 2020, citing KR 10-1321928, KR 10-2015-0006937, KR 10-1384800, KR 10-1451405, and U.S. Pat. No. 6214084.

Chinese Office Action—Chinese Application No. 201980076938.2 issued on Mar. 2, 2022, citing KR 101384802, CN 102575304, CN 101117650, CN 104870657, and ATA 11092000.

European Search Report—European Application No. 19887695.5 issued on Nov. 2, 2021, citing KR 10-1321928, 1 KR 10-1376138, and KR 10-2015-0006937.

* cited by examiner

DEVICE FOR MANUFACTURING MOLTEN IRON

TECHNICAL FIELD

An embodiment of the present invention relates to a device for manufacturing molten iron using a flow reduction furnace. More particularly, the present invention relates to a device for manufacturing molten iron for producing molten iron through a melt reduction process of powdered iron ore.

BACKGROUND ART

In general, a molten reduction iron ore process (for example, a FINEX process) that produces reduced iron by reducing a powdered iron ore with a size of several mm or less may be divided into a moving bed reduction process using a moving bed type of reduction furnace and a fluidized bed reduction process according to a contact state of iron ore and a reducing gas.

It is known that about 2.18 tons of carbon dioxide are generated in a steel making process to produce 1 ton of steel products, and in order to reduce the amount of carbon dioxide generated, efforts are being made to improve process efficiency, including reducing a ratio of a reducing agent for molten iron production, however since the process efficiency has reached its limit, it is very difficult to reduce additional carbon dioxide.

Further, the iron ore is largely classified into hematite, limonite, and magnetite, and the ores used in an ironmaking processes such as a blast furnace and the FINEX are mainly hematite and limonite, which is because these ores are excellent in reducibility and may be produced with a low reducing agent ratio (RR).

However, as high-quality hematite and limonite are becoming gradually depleted worldwide, it is expected that ore prices will increase and ore supply will become difficult. Therefore, the use of magnetite should be gradually increased in the ironmaking process, but magnetite generally has a spinel structure and has a very dense structure, so the reduction reaction does not occur inside particles thereof and the reduction reaction occurs only on the particle surface due to poor reducibility, thereby it is not easy to increase the usage cost because the reducibility is very low.

The above information disclosed in this Background section is only for enhancement of understanding of the background of the invention, and therefore it may contain information that does not form the prior art that is already known in this country to a person of ordinary skill in the art.

DISCLOSURE

Technical Problem

An exemplary embodiment of the present invention is to provide a device for manufacturing molten iron capable of increasing an amount of use of magnetite with low-quality reducibility and reducing an amount of generated carbon dioxide.

Technical Solution

A device for manufacturing a molten iron according to an embodiment of the present invention may include i) a multi-stage fluidized reduction furnace for reducing an amount of powdered iron ore including hematite and limonite, ii) a melting gas furnace connected to the fluidized reduction furnace through an ore conduit and a gas conduit, iii) a fluidized bed oxidation furnace for oxidizing magnetite to be converted into hematite through steam provided from the fluidized reduction furnace, and iv) a hydrogen processing unit for processing hydrogen generated by the oxidation reaction of magnetite in the fluidized bed oxidation furnace.

The device for manufacturing the molten iron according to an embodiment of the present invention may further include a hematite supply conduit for connecting the fluidized bed oxidation furnace and the ore conduit and supplying hematite oxidized in the fluidized bed oxidation furnace to the fluidized reduction furnace through the ore conduit.

The device for manufacturing the molten iron according to an embodiment of the present invention may further include a heat recovery device for recovering heat of the reduced gas discharged from the fluidized reduction furnace and generating steam, a steam supply line connecting the fluidized bed oxidation furnace and the heat recovery device and supplying the steam generated in the heat recovery device to the fluidized bed oxidation furnace, and a hydrogen rich gas exhaust line for discharging a hydrogen rich gas generated from the fluidized bed oxidation furnace.

The device for manufacturing the molten iron according to an embodiment of the present invention may further include an auxiliary gas supply unit connected to the steam supply line and supplying an auxiliary gas as air or nitrogen gas to the fluidized bed oxidation furnace.

In the device for manufacturing the molten iron according to an embodiment of the present invention, the hydrogen processing unit may include a scrubber that is connected to the hydrogen rich gas exhaust line and removes steam and magnetite dust included in the hydrogen rich gas, a compressor connected to the scrubber and boosting the hydrogen rich gas discharged from the scrubber, and a first gas circulation line that connects the compressor and the melting gas furnace and supplies the hydrogen rich gas to the melting gas furnace.

In the device for manufacturing the molten iron according to an embodiment of the present invention, the hydrogen processing unit may further include a second gas circulation line that connects the first gas circulation line and the gas conduit and supplies the hydrogen rich gas to the fluidized reduction furnace through the gas conduit.

In the device for manufacturing the molten iron according to an embodiment of the present invention, the first gas circulation line and the second gas circulation line may be connected through a three-way valve.

In the device for manufacturing the molten iron according to an embodiment of the present invention, the hydrogen processing unit may further include a hydrogen purifier connected to the first gas circulation line and separating a hydrogen gas from the hydrogen rich gas, and a hydrogen storage tank connected to the hydrogen purifier and storing a hydrogen gas separated from the hydrogen purifier.

Advantageous Effects

As an embodiment of the present invention increases the amount of magnetite used, it may actively respond to an increasing in ore price and a difficulty in supplying ore as hematite or limonite with high-quality reducibility is gradually depleted.

Furthermore, in an embodiment of the present invention, since the hydrogen rich gas generated by the oxidation reaction of magnetite and the steam in the fluidized bed oxidation furnace may be used as a reduced gas in the melting gas furnace, the amount of carbon dioxide generated may be reduced.

Further, effects that can be obtained or expected from exemplary embodiments of the present invention are directly or suggestively described in the following detailed description. That is, various effects expected from exemplary embodiments of the present invention will be described in the following detailed description.

DESCRIPTION OF THE DRAWINGS

The above and/or other aspects and advantages of the prevent invention will become apparent and more readily appreciated from the following description of the exemplary embodiments, taken in conjunction with the accompany drawings.

MODE FOR INVENTION

Figure 1:
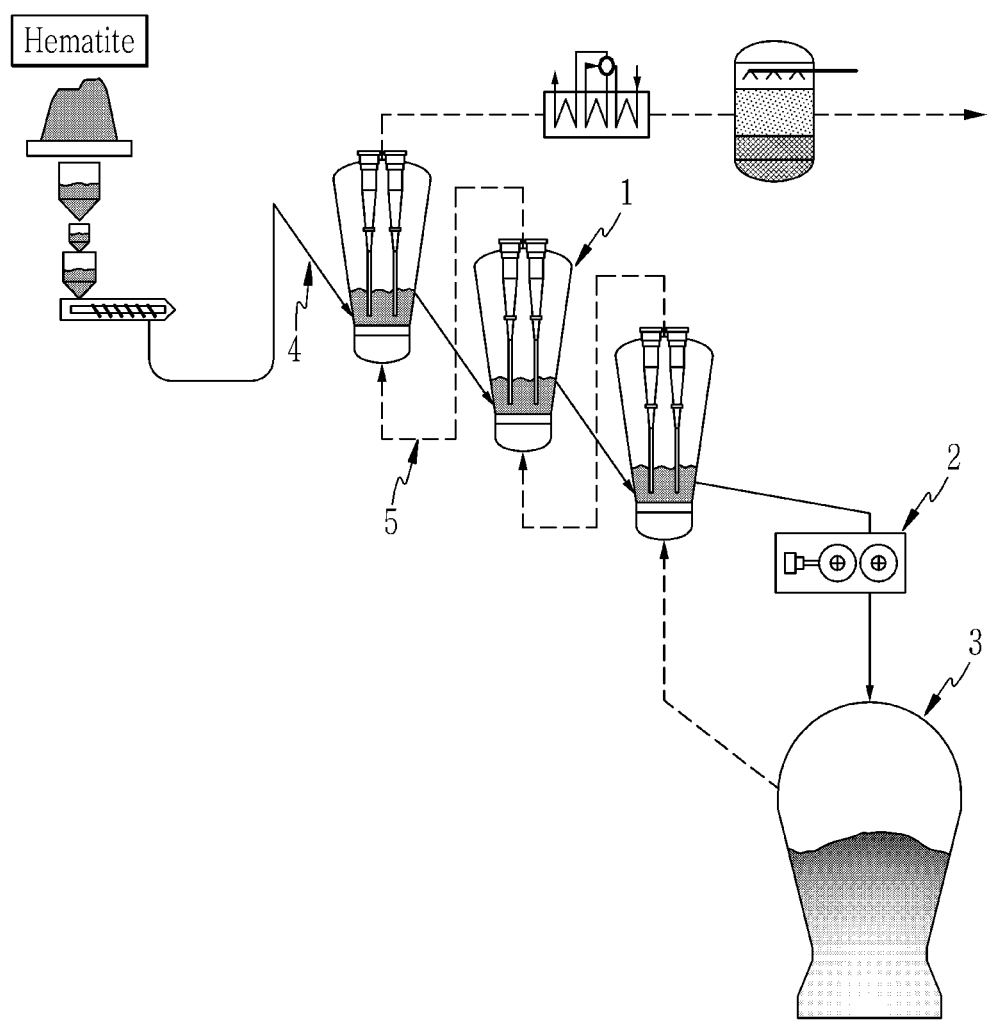
FIG. 1 is a block diagram schematically showing a typical device for manufacturing molten iron.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Descriptions of parts not related to the present invention are omitted, and like reference numerals designate like elements throughout the specification.

Further, since sizes and thicknesses of constituent members shown in the accompanying drawings are arbitrarily given for better understanding and ease of description, the present invention is not limited to the illustrated sizes and thicknesses.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element.

In addition, unless explicitly described to the contrary, the word "comprise", and variations such as "comprises" or "comprising", will be understood to imply the inclusion of stated elements but not the exclusion of any other elements.

Further, the terminologies described in the specification, such as "unit", "means", "part", "member, etc. refer to units performing at least one function or operation.

A typical device for manufacturing a molten iron in a fluidized bed reduction process, as shown in FIG. 1, is equipped with a multi-stage fluidized reduction furnace 1, a compaction device 2, and a melting gas furnace 3 in which a coal-filled bed is formed.

In the fluidized bed reduction process, as the powdered iron ore goes through the multi-stage flow reduction furnace 1 sequentially through the ore conduit 4 and contacts a high-temperature reducing air stream supplied from the melting gas furnace 3 through the gas conduit 5, it is converted into high-temperature reduction powered ore (also referred to as "powered reduced iron" or "reduced iron" in the industry), in which a temperature is elevated and the reduction of more than 90% is made, and discharged.

In other words, the reduced powdered iron ore is continuously charged into the melting gas furnace in which the coal-filled bed is formed and melted in the coal-filled bed to be converted into the molten iron and discharged to the outside of the melting gas furnace.

Figure 2:
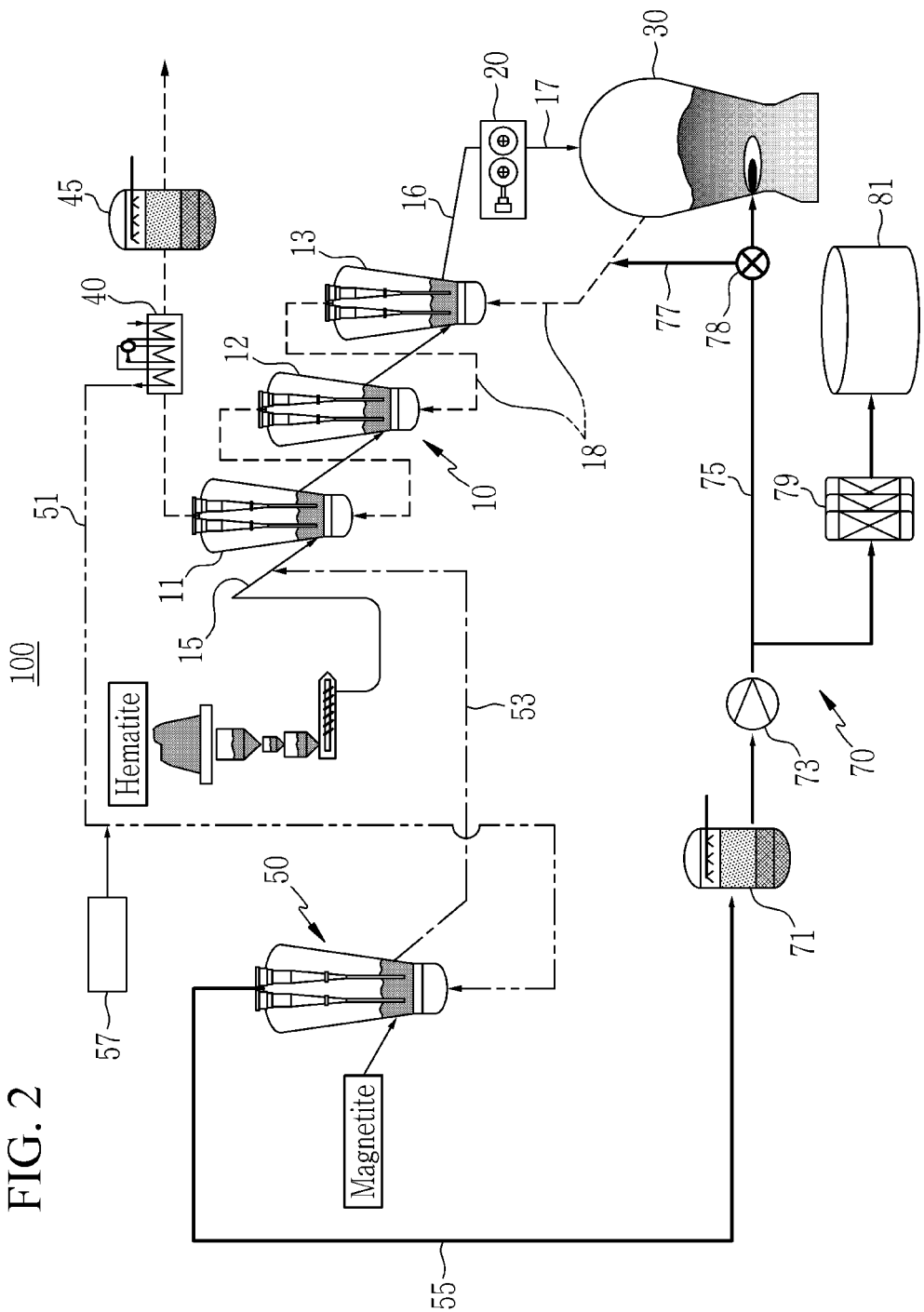
FIG. 2 is a block diagram schematically showing a device for manufacturing molten iron according to an embodiment of the present invention.

FIG. 2 is a block diagram schematically showing a device for manufacturing molten iron according to an embodiment of the present invention.

Referring to FIG. 2, a device 100 for manufacturing molten iron according to an embodiment of the present invention may be applied to a melting-reduction steelmaking process (e.g., a FINEX process, etc.) to produce reduced iron by reducing powdered iron ore having a size of several mm or less.

The device 100 for manufacturing the molten iron according to an embodiment of the present invention may increase the amount of use of magnetite with low-quality reducibility, and has a structure that may reduce the amount of carbon dioxide generated.

To this end, a device 100 for manufacturing the molten iron according to an embodiment of the present invention includes a multi-stage fluidized reduction furnace 10, a reduced iron compressor 20, a melting gas furnace 30, a fluidized bed oxidation furnace 50, and a hydrogen processing unit 70.

In an embodiment of the present invention, the multi-stage fluidized reduction furnace 10 is for producing the reduced iron by removing oxygen from the iron ore (the powdered iron ore) including hematite and limonite, and is substantially connected to the melting gas furnace 30 through the reduced iron compressor 20 to be further described later.

This multi-stage fluidized reduction furnace 10 may be composed of a three-stage fluidized reduction furnace including a first fluidized reduction furnace 11, a second fluidized reduction furnace 12, and a third fluidized reduction furnace 13 in an embodiment of the present invention.

However, in the present invention, the multi-stage fluidized reduction furnace 10 is not necessarily limited to being composed of a three-stage fluidized reduction furnace, and may be composed of a three-stage or more multi-stage fluidized reduction furnace.

Here, the classification of the multi-stage fluidized reduction furnace 10 into first, second, and third fluidized reduction furnaces 11, 12, and 13 is to classify them with the same configuration and is not necessarily limited to the order.

In an embodiment of the present invention, based on the order of disposed from top to bottom as shown in the drawing, the uppermost fluidized reduction furnace is called the first fluidized reduction furnace 11, the lowermost fluidized reduction furnace is called the third fluidized reduction furnace 13, and the fluidized reduction furnace in the middle side is called the second fluidized reduction furnace 12.

That is, in an embodiment of the present invention, the first fluidized reduction furnace 11 may be defined as the first fluidized reduction furnace in which the charged material of iron ore and auxiliary materials are charged, and the third fluidized reduction furnace 13 may be defined as a final fluidized reduction furnace in which the iron ore and the auxiliary materials are finally reduced to provide the reduced iron.

In an embodiment of the present invention, the reduced iron compressor 20 (also referred to as "a compacting device" in the industry) is to compress the reduced iron and sub-material, which are finally reduced in the third fluidized reduction furnace 13 through a multi-stage fluidized reduction furnace 10, to be molded into a compacted material.

The reduced iron compressor 20 is a pressure molding device that pressurizes and molds the reduced iron and the sub-material, and is also referred to as "a HCI machine" in the industry. The reduced iron compressor 20 compresses the reduced iron and the sub-materials finally reduced in the third fluidized reduction furnace 13 to be molded into the compacted material, and then stores the compacted material in a compress reduced iron storage tank (not shown in the drawing). The compacted material is charged from a compressed reduced iron storage tank into a melting gas furnace 30 with a coal briquette and melted in the melting gas furnace 30.

In an embodiment of the present invention, the melting gas furnace 30 is a device that produces the molten iron by reducing and melting the reduced iron obtained from the multi-stage fluidized reduction furnace 10 by using high heat and a reducing gas.

In the above, the high heat and the reducing gas are generated in the reactor by air or oxygen supplied to the melting gas furnace 30 and the combustion of coal, or pulverized coal, supplies heat in the reactor, and acts on the reduced iron to remove oxygen, allowing separation into the molten iron and other material slag through the reduction and the melting.

Here, the first to third fluidized reduction furnaces 11, 12, and 13 of the multi-stage fluidized reduction furnace 10 are connected through an ore conduit 15, where the iron ores and the sub-materials flow. Further, the third fluidized reduction furnace 13 of the multi-stage fluidized reduction furnace 10 and the reduced iron compressor 20 are connected through a reduced iron conduit 16, and the reduced iron compressor 20 and the melting gas furnace 30 are connected through the compacted material conduit 17.

Furthermore, the first to third fluidized reduction furnaces 11, 12, and 13 of the multi-stage fluidized reduction furnace 10 and the melting gas furnace 30 are connected to the gas conduit 18 through which the reducing gas flows.

That is, the coal briquettes manufactured by a coal briquette maker are charged into the melting gas furnace 30 and generate the reducing gas in the melting gas furnace 30, which is supplied the first to third fluidized reduction furnaces 11, 12, and 13 of the multi-stage fluidized reduction furnace 10 through the gas conduit 18. In addition, the iron ore is supplied to the multi-stage fluidized reduction furnace 10 through the ore conduit 15 along with the sub-materials, and flows by the reduced gas supplied from the melting gas furnace 30 to the multi-stage fluidized reduction furnace 10 to be manufactured into the reduced iron.

On the other hand, the device 100 for manufacturing the molten iron 100 according to an embodiment of the present invention further includes a heat recovery device 40. The heat recovery device 40 recovers the heat of the reduced gas finally discharged from the first fluidized reduction furnace 11 of the multi-stage fluidized reduction furnace 10 through the gas conduit 18 and generates steam (a gas).

Reference numeral 45, which is not described in the drawings, is connected to the heat recovery device 40, and indicates a dust collector that collects solid components in the reduced gas and separates gas components. Since this dust collector 45 is made as a known reduced gas scrubber that is widely known in the art, a more detailed description is omitted in this specification.

In an embodiment of the present invention, the fluidized bed oxidation furnace 50 is to oxidize magnetite with low-quality reducibility compared to hematite or limonite to be converted into hematite through steam as an oxidizing gas provided in the first fluidized reduction furnace 11 of the multi-stage fluidized reduction furnace 10.

The fluidized bed oxidation furnace 50 is a reactor equipped to be capable of inserting a powdered iron type of magnetite and inflowing the steam inflow and is connected to the heat recovery device 40 mentioned above through the steam supply line 51. The steam supply line 51 connects the fluidized bed oxidation furnace 50 and the heat recovery device 40, and may supply the steam generated from the heat recovery device 40 to the fluidized bed oxidation furnace 50.

In the fluidized bed oxidation furnace 50, like a Chemical Formula of $2Fe3O_4+H_2O=3Fe_2O_3+H_2$, magnetite is converted into hematite by the oxidation reaction of magnetite and the steam and generates hydrogen gas. This fluidized bed oxidation furnace 50 is capable of releasing a hydrogen rich gas including an oxidized hematite and hydrogen gas.

In an embodiment of the present invention, the fluidized bed oxidation furnace 50 may discharge the oxidized hematite and may supply it to a multi-stage fluidized reduction furnace 10. Accordingly, the fluidized bed oxidation furnace 50 is connected to the ore conduit 15 at the front side of the first fluidized reduction furnace 11 through the hematite supply line 53.

Therefore, the hematite oxidized in the fluidized bed oxidation furnace 50 may be supplied to the ore conduit 15 on the front side of the first fluidized reduction furnace 11 through the hematite supply line 53, supplied to the first fluidized reduction furnace 11 through the ore conduit 15 to be reduced, and further reduced through the second and third fluidized reduction furnaces 12 and 13 through another ore conduit 15.

In addition, the fluidized bed oxidation furnace 50 further includes a hydrogen rich gas exhaust line 55 to discharge a hydrogen rich gas generated by the oxidation reaction of magnetite and steam.

Furthermore, an embodiment of the present invention includes an auxiliary gas supply unit 57 for additionally supplying an auxiliary gas as an oxidizing gas to the fluidized bed oxidation furnace 50.

This auxiliary gas supply unit 57 supplies air and/or nitrogen gas as the oxidizing gas in addition to the steam to the fluidized bed oxidation furnace 50, which is connected to the steam supply line 51 through a separate supply line.

In an embodiment of the present invention, the hydrogen processing unit 70 is for processing hydrogen (gas) generated by the oxidation reaction of the oxidizing gas of magnetite in the fluidized bed oxidation furnace 50.

The hydrogen processing unit 70 includes a scrubber 71, a compressor 73, a first gas circulation line 75, a second gas circulation line 77, a hydrogen purifier 79, and a hydrogen storage tank 81.

The scrubber 71 is connected to the hydrogen rich gas exhaust line 55 of the fluidized bed oxidation furnace 50. The scrubber 71 is capable of removing steam and magnetite dust from the hydrogen rich gas exhausted through the hydrogen rich gas exhaust line 55.

The compressor 73 is connected to the scrubber 71 and functions to boost the hydrogen rich gas (the gas from which the steam and magnetite dust have been removed) discharged from the scrubber 71.

The first gas circulation line 75 is to supply the hydrogen rich gas as a reduced gas to the melting gas furnace 30, and connects the compressor 73 and the gas injection side of the melting gas furnace 30.

The second gas circulation line 77 is for supplying the hydrogen rich gas to the multi-stage fluidized reduction furnace 10 through the gas conduit 18, and connects the first gas circulation line 75 and the gas conduit 18. For example, the second gas circulation line 77 connects the gas conduit 18 connecting the third fluidized reduction furnace 13 and the melting gas furnace 30, and the first gas circulation line 75.

Here, the first gas circulation line 75 and the second gas circulation line 77 are connected through a three-way valve 78 known in the art. Here, the hydrogen rich gas boosted by the compressor 73 may be injected into the melting gas furnace 30 through the first gas circulation line 75 by the operation of the three-way valve 78. In addition, the hydrogen rich gas that is boosted by the compressor 73 and supplied to the first gas circulation line 75 may be supplied to the multi-stage fluidized reduction furnace 10 through the second gas circulation line 77 by the operation of the three-way valve 78. Furthermore, the hydrogen rich gas boosted by the compressor 73 may be supplied to the melting gas furnace 30 and the multi-stage fluidized reduction furnace 10 respectively through the first and second gas circulation lines 75 and 77 through the operation of the three-way valve 78. The first and second gas circulation lines 75 and 77 are closed by the operation of the three-way valve 78, and the hydrogen rich gas supplied to the melting gas furnace 30 and the multi-stage fluidized reduction furnace 10 may be blocked.

The hydrogen purifier 79 is to separate only hydrogen gas from the hydrogen rich gas supplied through the compressor 73, and is connected to the first gas circulation line 75. Since this hydrogen purifier 79 is made of a PSA or a membrane type of hydrogen purification unit well known in the art, a more detailed description is omitted in this specification.

In the above, the hydrogen rich gas boosted through the compressor 73 may be supplied to the hydrogen purifier 79 in the state that the first and second gas circulation lines 75 and 77 are closed by the operation of the three-way valve 78.

Also, the hydrogen storage tank 81 is connected to hydrogen purifier 79 and stores the hydrogen gas separated from the hydrogen purifier 79 at a high pressure, and may supply the hydrogen gas to the outside of the system.

Hereinafter, the operation of the device for manufacturing the molten iron 100 configured as above-described is described in detail with reference to FIG. 2 disclosed above.

First, in an embodiment of the present invention, the powdered iron ore containing hematite and/or limonite (for example, hematite) as a main raw material and the sub-materials are injected into the first fluidized reduction furnace 11 of the multi-stage fluidized reduction furnace 10.

Then, in an embodiment of the present invention, the powdered iron ore sequentially goes through the first, second, and third fluidized reduction furnaces 11, 12, and 13 of the multi-stage fluidized reduction furnace 10 through the ore conduit 15, and is in contact with the high temperature reduced gas supplied through the gas conduit 18 from the melting gas furnace 30 to be reduced into the reduced iron. And, the high temperature reduced iron finally reduced in the third fluidized reduction furnace 13 is supplied to the reduced iron compressor 20 through the reduced iron conduit 16.

Next, in the reduced iron compressor 20, the reduced iron is compressed and molded into the compacted material, and the compacted material is supplied to the melting gas furnace 30 through the compacted material conduit 17.

Therefore, the melting gas furnace 30 produces the molten iron by melting the reduced iron by using high heat and the reduced gas.

Here, the reduced gas finally discharged from the first fluidized reduction furnace 11 is supplied to the heat recovery device 40, and the heat recovery device 40 recovers the heat of the reduced gas and generates steam (a gas).

In this process, in an embodiment of the present invention, magnetite in the form of the powder iron is injected into the fluidized bed oxidation furnace 50, and the steam as the oxidizing gas generated in the heat recovery device 40 is supplied to the fluidized bed oxidation furnace 50 through the steam supply line 51.

Then, in the fluidized bed oxidation furnace 50, magnetite is converted into hematite by the oxidation reaction of magnetite and the steam, and the hydrogen rich gas including the hydrogen gas is generated.

If the steam as an oxidizing gas for oxidizing the magnetite is insufficient, in an embodiment of the present invention, air or nitrogen gas may be supplied to steam supply line 51 through the auxiliary gas supply unit 57, and air or nitrogen gas may be additionally supplied to the fluidized bed oxidation furnace 50 through the steam supply line 51.

As such, the magnetite oxidized in the fluidized bed oxidation furnace 50 may be supplied to the ore conduit 15 on the front side of the first fluidized reduction furnace 11 through the hematite supply line 53 so that it may be supplied into the first fluidized reduction furnace 11 through that ore conduit 15 to be reduced, and may be additional reduced while passing through the second and third fluidized reduction furnaces 12 and 13 through another ore conduit 15.

The hydrogen rich gas generated by the oxidation reaction of magnetite and the steam In the fluidized bed oxidation furnace 50 is discharged through the hydrogen rich gas exhaust line 55 and supplied to the scrubber 71 of the hydrogen processing unit 70.

Thus, the scrubber 71 removes the steam and the magnetite dust from the hydrogen rich gas. The hydrogen rich gas passed through the scrubber 71 is boosted through the compressor 73.

Next, in an embodiment of the present invention, the hydrogen rich gas boosted by the compressor 73 may be injected into the melting gas furnace 30 through the first gas circulation line 75 through the operation of the three-way valve 78. At this time, the hydrogen rich gas may be used as an additional reduced gas injected into the melting gas furnace 30.

In addition, in an embodiment of the present invention, the hydrogen rich gas that is boosted by the compressor 73 and supplied to the first gas circulation line 75 may be supplied to the multi-stage fluidized reduction furnace 10 through the second gas circulation line 77 through the operation of the three-way valve 78. At this time, the hydrogen rich gas may also be supplied to the third fluidized reduction furnace 13 through the second gas circulation line 77 and the gas conduit 18.

Furthermore, in an embodiment of the present invention, the hydrogen rich gas boosted by the compressor 73 may be simultaneously supplied to the melting gas furnace 30 and the multi-stage fluidized reduction furnace 10 through the first and second gas circulation lines 75 and 77 by the operation of the three-way valve 78.

On the other hand, in an embodiment of the present invention, the hydrogen rich gas boosted through the compressor 73 may be supplied to the hydrogen purifier 79 in the state that the first and second gas circulation lines 75 and 77 are closed by the operation of the three-way valve 78.

Then, the hydrogen purifier 79 separates only the hydrogen gas from the hydrogen rich gas, and the separated hydrogen gas may be stored at a high pressure in the hydrogen storage tank 81 and be supplied out of the system.

According to the device 100 for manufacturing the molten iron according to an embodiment of the present invention as described so far, magnetite with relatively low quality reductivity may be oxidized to be converted into hematite in a fluidized bed oxidation furnace 50, and the hematite may be supplied to the multi-stage fluidized reduction furnace 10.

Therefore, in an embodiment of the present invention, by increasing the amount of magnetite used, it is possible to actively respond to an increase in ore price and a difficulty in supplying ore as hematite or limonite with high-quality reducibility is gradually depleted.

In addition, in an embodiment of the present invention, the hydrogen rich gas generated by the oxidation reaction of magnetite and steam in the fluidized bed oxidation furnace 50 may be used as the reduced gas in the melting gas furnace 30.

Accordingly, in an embodiment of the present invention, by increasing the amount of the reduced gas inflow to the process, it is possible to reduce the amount of carbon dioxide generated per unit molten iron dose by reducing the consumption of carbon consumed throughout the process.

Furthermore, in an embodiment of the present invention, since the hydrogen rich gas may be purified to compress and store the hydrogen gas, and hydrogen gas may be used or sold outside the system, the manufacturing cost of the molten iron may be lowered.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: multi-stage fluidized reduction furnace
11: first fluidized reduction furnace
12: second fluidized reduction furnace
13: third fluidized reduction furnace
15: ore conduit
16: reduced iron conduit
17: compacted material conduit
18: gas conduit
20: reduced iron compressor
30: melting gas furnace
40: heat recovery device
45: dust collector
50: fluidized bed oxidation furnace
51: steam supply line
53: hematite supply line
55: hydrogen rich gas exhaust line
57: auxiliary gas supply unit
70: hydrogen processing unit
71: scrubber
73: compressor
75: first gas circulation line
77: second gas circulation line
78: three-way valve
79: hydrogen purifier
81: hydrogen storage tank
100: device for manufacturing molten iron

What is claimed is:

1. A device for manufacturing a molten iron comprising:
   a multi-stage fluidized reduction furnace for reducing a powdered iron ore including hematite and limonite;
   a melting gas furnace connected to the fluidized reduction furnace through an ore conduit and a gas conduit;
   a fluidized bed oxidation furnace for oxidizing magnetite to be converted into hematite through steam provided from the fluidized reduction furnace;
   a hydrogen processing unit for processing hydrogen generated by the oxidation reaction of magnetite in the fluidized bed oxidation furnace;
   a heat recovery device for recovering heat of the reduced gas discharged from the fluidized reduction furnace and generating steam;
   a steam supply line connecting the fluidized bed oxidation furnace and the heat recovery device and supplying the steam generated in the heat recovery device to the fluidized bed oxidation furnace; and
   a hydrogen rich gas exhaust line for discharging a hydrogen rich gas generated from the fluidized bed oxidation furnace,
   wherein the hydrogen processing unit includes:
   a scrubber that is connected to the hydrogen rich gas exhaust line and removes steam and magnetite dust included in the hydrogen rich gas,
   a compressor connected to the scrubber and boosting the hydrogen rich gas discharged from the scrubber, and
   a first gas circulation line that connects the compressor and the melting gas furnace and supplies the hydrogen rich gas to the melting gas furnace.

2. The device for manufacturing the molten iron of claim 1, further comprising
   a hematite supply conduit for connecting the fluidized bed oxidation furnace and the ore conduit and supplying hematite oxidized in the fluidized bed oxidation furnace to the fluidized reduction furnace through the ore conduit.

3. The device for manufacturing the molten iron of claim 1, further comprising:
   an auxiliary gas supply unit connected to the steam supply line and supplying an auxiliary gas as air or nitrogen gas to the fluidized bed oxidation furnace.

4. The device for manufacturing the molten iron of claim 1, wherein
   the hydrogen processing unit further includes
   a second gas circulation line that connects the first gas circulation line and the gas conduit and supplies the hydrogen rich gas to the fluidized reduction furnace through the gas conduit.

5. The device for manufacturing the molten iron of claim 4, wherein
   the first gas circulation line and the second gas circulation line are connected through a three-way valve.

6. The device for manufacturing the molten iron of claim 4, wherein
   the hydrogen processing unit further includes
   a hydrogen purifier connected to the first gas circulation line and separating a hydrogen gas from the hydrogen rich gas, and
   a hydrogen storage tank connected to the hydrogen purifier and storing a hydrogen gas separated from the hydrogen purifier.

* * * * *